(12) United States Patent
Muyldermans et al.

(10) Patent No.: US 11,926,731 B2
(45) Date of Patent: Mar. 12, 2024

(54) BLOCK COPOLYMER COMPOSITIONS

(71) Applicant: Kraton Polymers LLC, Houston, TX (US)

(72) Inventors: Xavier D. D. J. Muyldermans, Louvain-la-Neuve (BE); Arwin W. van der Waal, Amsterdam (NL); Hendrik de Groot, Louvain-la-Neuve (BE)

(73) Assignee: KRATON CORPORATION, Houston, TX (US)

( * ) Notice: Subject to any disclaimer, the term of this patent is extended or adjusted under 35 U.S.C. 154(b) by 240 days.

(21) Appl. No.: 17/445,394

(22) Filed: Aug. 18, 2021

(65) Prior Publication Data

US 2022/0064432 A1    Mar. 3, 2022

Related U.S. Application Data

(60) Provisional application No. 62/706,564, filed on Aug. 25, 2020.

(51) Int. Cl.
*C08L 53/02*     (2006.01)
*C08F 293/00*    (2006.01)

(52) U.S. Cl.
CPC .......... *C08L 53/025* (2013.01); *C08F 293/00* (2013.01); *C08L 2201/02* (2013.01); *C08L 2201/08* (2013.01); *C08L 2207/04* (2013.01)

(58) Field of Classification Search
CPC .. C08F 293/00; C08L 53/025; C08L 2207/04; C08L 2201/08; C08L 2201/02
See application file for complete search history.

(56) References Cited

U.S. PATENT DOCUMENTS

| | | | |
|---|---|---|---|
| 5,891,957 A | 4/1999 | Hansen et al. | |
| 7,592,390 B2 * | 9/2009 | Bening | C08F 287/00 524/505 |
| 2003/0225209 A1 * | 12/2003 | Handlin, Jr. | C08L 23/10 525/88 |
| 2003/0232928 A1 * | 12/2003 | Atwood | C08L 23/0815 525/333.3 |
| 2012/0059108 A1 | 3/2012 | Date | |
| 2014/0102930 A1 | 4/2014 | Sasaki | |
| 2015/0005436 A1 | 1/2015 | Zhao | |

FOREIGN PATENT DOCUMENTS

| | | |
|---|---|---|
| DE | 102019119630 A1 | 1/2020 |
| EP | 2186859 B1 | 7/2015 |
| EP | 3325519 B1 | 6/2019 |

* cited by examiner

*Primary Examiner* — Robert D Harlan

(57) ABSTRACT

A composition comprising selectively hydrogenated block copolymers (a) and (b having peak molecular weights of 150-1,000 kg/mol, 6-60 kg/mol, respectively, is disclosed. Component (a) comprises one or more structures A-B-A, (A-B-A)nX, A-(B-A)n, and (A-B)nX. Component (b) comprises one or more structures C-D, D-C-D, and (D-C)nX. The value of "n" is 1-30, and "X" is a residue of a coupling agent. Before hydrogenation, blocks A and C, are vinyl aromatic polymer blocks; and blocks B and D are polymer blocks comprising 60-100 mol % of one or more conjugated dienes and 0-40 mol % of a vinyl aromatic monomer. The HSBC compositions and TPE blends exhibits good elasticity, good processability, low extractables, and low compression set.

19 Claims, No Drawings

BLOCK COPOLYMER COMPOSITIONS

RELATED APPLICATIONS

This application claims priority from U.S. Provisional Application No. 62/706,564, with a filing date of Aug. 25, 2020, which is incorporated herein by reference.

FIELD

The present disclosure relates to compositions based on block copolymers and their uses.

BACKGROUND

Elastomeric materials are widely used in a variety of applications, such as adhesives, sealants, coatings, tires, the automotive industry, construction industry, electrical and electronic industry, and medical applications. The desirable properties include, e.g., good mechanical performance, low viscosity and reactivity. In medical applications, some uses require materials with flow and good strength during production, in addition to better elasticity and resistance to leaching/bleed out or extractability during sterilization in the final application. Good mechanical performance in term of strength, elasticity, e.g., a low compression set, and weather resistance or ozone resistance are also desirable. Existing thermoplastic materials may not be able to meet such requirements.

There is a need for polymeric compositions exhibiting thermoplastic flow properties, in addition to very low leaching and good mechanical properties.

SUMMARY

In one embodiment, a composition is disclosed. The composition comprises, consists essentially of, or consists of: components (a), (b), wherein component (a) is a selectively hydrogenated block copolymer comprising one or more structures A-B-A, (A-B-A)nX, A-(B-A)n, and (A-B)nX. Component (b) is a selectively hydrogenated block copolymer comprising one or more structures C-D, D-C-D, and (D-C-)nX; In the formulas, "n" is 1-30, and "X" is a residue of a coupling agent. Before hydrogenation, A is a polymer block of a vinyl aromatic monomer, having a peak molecular weight (Mp) of 14-60 kg/mol, B is a polymer block comprising 60-100 mol % of one or more conjugated dienes, and 0-40 mol % of a vinyl aromatic monomer; C is a polymer block of a vinyl aromatic monomer, having a peak molecular weight of 1-8 kg/mol; D is a polymer block comprising 60-100 mol % of one or more conjugated dienes, and 0-40 mol % of a vinyl aromatic monomer; After hydrogenation, from more than 80 to 100 mol % of the polymerized diene units, and from 0-20 mol % of the polymerized vinyl aromatic monomer units in the polymer blocks A, B, C and D are reduced. The vinyl aromatic monomers of the polymer blocks A, B, C and D are independently same or different; and the conjugated diene monomers for the polymer blocks B and D are independently same or different. The block copolymer (a) has a peak molecular weight of from 150-1,000 kg/mol and the block copolymer (b) has a peak molecular weight of from 6-60 kg/mol, The overall block copolymer composition has a compression set, after 24 h at 70° C. of less than 40 percent, measured according to ASTM D395.

Another aspect of the disclosure is a blend comprising the above block copolymer composition and a semi-crystalline polyolefin.

Other aspects of the disclosure include molding compositions and articles made using the above block copolymer composition.

DESCRIPTION

The following terms will have the following meanings:

"Molecular weight" or MW refers to the styrene equivalent molecular weight in kg/mol of a polymer block or a block copolymer. The molecular weights can be measured with gel permeation chromatography (GPC) using polystyrene calibration standards according to ASTM 5296-19. The chromatograph can be calibrated using commercially available polystyrene molecular weight standards. The MW so calibrated are styrene equivalent molecular weights. The detector can be a combination ultraviolet and refractive index detector. The MW expressed herein are measured at the peak of the GPC trace, and are commonly referred to as "peak molecular weight" ($M_p$). Unless otherwise specified, MW refers to the styrene equivalent peak molecular weights $M_p$.

"Corrected 1,4-diene unit content", "C14DUC", in a polymer block having repeat units derived from butadiene (Bd), and isoprene, myrcene, farnesene, or any other conjugated diene (Ip), or combinations thereof, is mathematically given in terms of the parameters: wt. % Bd content (Bw) in the total dienes in the polymer block, wt. % of 1,4-addition units of Bd (B14) in the polymer block, wt. % Ip content (Iw) in the total dienes in the polymer block, and wt. % of 1,4-addition units of Ip (I14) in the polymer block, by equation (1):

$$C14DUC = (Bw * B14/100) + Iw * (I14-40)/100 \quad (1)$$

Polymerization of a conjugated diene gives rise to polymerized units that are based on addition across both double bonds (giving rise to 1,4-addition units) as well as one double bond (giving rise to vinyl groups).

"Polystyrene content" of a block copolymer refers to the % weight of polymerized styrene or a vinyl aromatic monomer in the block copolymer, calculated by dividing the sum of molecular weight of all polystyrene or polymerized vinyl aromatic units by the total molecular weight of the block copolymer. Polystyrene content can be determined using any suitable methodology such as proton NMR.

"Oil free" refers to a composition with <0.1 wt. %, or <0.05 wt. %, or <0.01 wt. %, paraffinic oil present based on the total weight of the composition. Similarly, phthalate-free compositions refer to composition wherein phthalate is not added, with <0.1 wt. %, or <0.05 wt. %, or <0.01 wt. % phthalate present.

"HSBC" refers to a selectively hydrogenated styrenic block copolymer. The hydrogenated styrenic block copolymer is based on copolymerized conjugated diene and styrenic monomers and in which a significant fraction of the double bonds resulting from the conjugated diene units have been reduced or hydrogenated, with "selectively" meaning the conjugated bond fully (e.g., >95%, or >98%) hydrogenated and the aromatic bond being a lot less hydrogenated (e.g., 0 to 15%).

The disclosure relates to HSBC compositions and the blends thereof, in embodiments, a hydrogenated block copolymer with a triblock and a short diblock, for use in oil-free/phthalate-free thermoplastic elastomer ("TPE") blends exhibiting thermoplastic flow properties, in addition to excellent mechanical properties, e.g., improved elasticity and resistance to extraction after sterilization, suitable for applications including medical.

HSBC Composition: The composition comprises components (a) and (b), where each component encompasses different types of block copolymers. The vinyl aromatic monomer repeat units in the polymer blocks A, B, C and D can be independently the same or different. Likewise, the conjugated diene monomer repeat units in the polymer blocks B and D can be independently the same or different. Each of the components (a) and (b) are described below in detail.

Component (a): The overall composition comprises components (a) and (b), where each component encompasses different types of block copolymers. The vinyl aromatic monomer repeat units in the polymer blocks A, B, C and D can be independently the same or different. Likewise, the conjugated diene monomer repeat units in the polymer blocks B and D can be independently the same or different. Each of the components are described below in detail. In embodiments, the components (a) and (b) are in a weight ratio of from 1:0.1 to 1:5, or from 1:0.3 to 1:3, or from 1:0.5 to 1:2.

Component (a) is a selectively hydrogenated block copolymer comprising one or more structures A-B-A, (A-B-A)$_n$X, A-(B-A)n, and (A-B)nX, where A is a polymer block, also termed a "rigid block", having repeat units of a vinyl aromatic monomer, B is a polymer block having repeat units of a conjugated diene and optionally a vinyl aromatic monomer, "n" is from 1-30, and X is a residue of a coupling agent.

In embodiments, the component (a) block copolymer can have a Mp of from 100-1000 kg/mol, or >150 kg/mol, or 150-800 kg/mol, or from 200-400 kg/mol.

In embodiments, prior to hydrogenation, the block "A" can have a Mp of 14-60 kg/mol, or 20-50 kg/mol, or 25-35 kg/mol.

In embodiments, the block "B", prior to hydrogenation, can have a Mp of 50-950 kg/mol, or 100-800 kg/mol, or 200-600 kg/mol, or 150-400 kg/mol.

In embodiments, the polymer block "A" can form from 18 to 40 wt. %, or from 22 to 38 wt. %, or from 26 to 32 wt. % of the selectively hydrogenated block copolymer component (a).

In embodiments, the block "B" can comprise 60-100 mol % of one or more conjugated dienes, and 0-40 mol % of a vinyl aromatic monomer; or 70-90 mol % of one or more conjugated dienes, and 10-30 mol % of a vinyl aromatic monomer; or >80 mol % of one or more conjugated dienes and <20 mol % of a vinyl aromatic monomer; or 100% of one or more conjugated dienes and no vinyl aromatic monomer.

In embodiments, the block "B" can comprise 100 mol % of butadiene or isoprene, or combinations thereof, and no vinyl aromatic monomer. In yet another embodiment, the block "B" can comprise 100 mol % of butadiene, and no vinyl aromatic monomer.

After hydrogenation, in an embodiment, from 80-100 mol %, or >85 mol %, or >90 mol %, or 91-99 mol % or 97-100 mol % of the polymerized diene units in the block B, and from 0-20 mol %, or >1 mol %, or 3-18 mol %, or <15 mol % or 0-5 mol % of the polymerized vinyl aromatic monomer units in the blocks A and B are reduced.

In embodiments, after hydrogenation, from 85-98 mol %, or 90-95 mol %, or >97 mol %, or >98% of the polymerized diene units in the block B, and from 2-15 mol %, or from 5-10 mol % of the polymerized vinyl aromatic monomer units in the blocks A and B are reduced.

In still other embodiments, after hydrogenation, from 0-10 mol %, or 1-8 mol %, or <7 mol %, or >2 mol % of the polymerized vinyl aromatic monomer units in the blocks "A" and "B" are reduced, and from more than 90 to 100 mol %, or 95 to 99 mole %, or >97 mol % of the polymerized diene units in the "B" block are reduced.

The vinyl aromatic compound used for building the polymer block "A" can be any aromatic compound having a vinyl group attached thereto. Non-limiting classes of compounds suitable for use include styrene and substituted styrenes, vinyl naphthalene and substituted vinyl naphthalenes, vinyl indenes, vinyl anthracenes, and 1,1-diphenyl ethylene. Some specific examples include vinyl aromatic compounds having 8-20 carbon atoms, such as o-methylstyrene, p-methylstyrene, p-tert-butylstyrene, 2,4-dimethylstyrene, alpha-methylstyrene, vinylnaphthalene, vinyltoluene and vinylxylene, or mixtures thereof. In embodiments, the vinyl aromatic compound can be styrene.

The polymer block B (also termed "rubber block") can contain from 60-100 mol % or 65-99 mol %, or >80 mol % or 100% of repeat units derived from a conjugated diene, and 0-40 mol %, or >2 mol %, or 5-35 mol %, or <38 mol % or 0% of repeat units derived from a vinyl aromatic monomer. Any conjugated diene can be used. In an embodiment, the conjugated diene has from four to eight carbon atoms. In another embodiment, the conjugated diene is selected from the group consisting of 1,3-butadiene, isoprene, myrcene, farnesene, 2,3-dimethyl-1,3-butadiene, 1,3-pentadiene, 1,3-hexadiene, and combinations thereof.

Component (b): Component (b) is one or more of a selectively hydrogenated block copolymer comprising one or more structures C-D, D-C-D, and (D-C-)$_n$X; where "C" is a polymer block having repeat units derived from a vinyl aromatic compound, "D" is a polymer block having repeat units of one or more conjugated dienes, and optionally a vinyl aromatic monomer, "n" is from 1-30, and X is a residue of a coupling agent.

In embodiments, the component (b) block copolymer has a Mp of 6-60 kg/mol, or 10-50 kg/mol, or 20-55 kg/mol, or <57 kg/mol or <52 kg/mol In embodiments, the block "C" has a Mp of 1-8 kg/mol, or 2-6 kg/mol, or 3-5 kg/mol or 3-7.5 kg/mol.

In embodiments, the block "D" has a Mp of 5-50 kg/mol, or 20-40 kg/mol.

In embodiments, the block "D" comprises 60-100 mol % of a conjugated diene, and 0-40 mol % of a vinyl aromatic monomer; or 70-90 mol % of a conjugated diene, and 10-30 mol % of a vinyl aromatic monomer; or >80 mol % of a conjugated diene and <20 mol % of a vinyl aromatic monomer; or essentially 100% mol of one or more conjugated dienes and very little if any vinyl aromatic monomer.

In embodiments, the block "D" comprises ~100 mol % of butadiene or isoprene, or combinations thereof, and very little if any vinyl aromatic monomer.

After hydrogenation, in embodiments, from 0-20 mol % of the polymerized vinyl aromatic monomer units in the block C are reduced, and from >80 to 100 mol % of the polymerized diene units, and from 0-20 mol % of the polymerized vinyl aromatic monomer units in the block D are reduced.

In embodiments, after hydrogenation, from 85-98 mol %, or 90-95 mol % of the polymerized diene units in the block D, and from 2-15 mol %, or from 5-10 mol % of the polymerized vinyl aromatic monomer units in the blocks C and D are reduced.

In embodiments, after hydrogenation, 0-10 mol % of the polymerized vinyl aromatic monomer units in the blocks "C" and "D" are reduced, and >90 to 100 mol %, or 95 to 100 mole % of the polymerized diene units in the "D" block are reduced.

The vinyl aromatic compound used for building the polymer block "C", and the vinyl aromatic compound and conjugated diene used for building the block "D" can be any of the examples discussed previously for the block copolymer component (a).

In embodiments, the polymer blocks "A" and "B" in the component (a) comprise polymerized vinyl aromatic monomer units derived from the same vinyl aromatic monomer, wherein the vinyl aromatic monomer units is selected from styrene, o-methylstyrene, p-methylstyrene, p-tert-butylstyrene, 2,4-dimethylstyrene, alpha-methylstyrene, vinylnaphthalene, vinyltoluene, vinylxylene, and combinations thereof.

In embodiments, the polymer blocks "C" and "D" in the component (b) can comprise polymerized vinyl aromatic monomer units derived from the same vinyl aromatic monomer, wherein the vinyl aromatic monomer units is selected from styrene, o-methylstyrene, p-methylstyrene, p-tert-butylstyrene, 2,4-dimethylstyrene, alpha-methylstyrene, vinylnaphthalene, vinyltoluene, vinylxylene, and combinations thereof.

In embodiments, the "Corrected 1,4-diene unit content" in the polymerized diene units in the blocks B and D, before hydrogenation, can independently vary over a range from 10-75 wt. %, or 15-65 wt. %, or 20-60 wt. %, or 40-50 wt. %, or 15-50%, or 20-45%. The 1,4-diene unit content can be varied by using certain additives (explained below) during the polymerization of the conjugated diene.

In embodiments, the polymer blocks B and D are composed of the same diene unit or same combination of diene units, with Corrected 1,4-diene unit content before hydrogenation not differing more than 15 wt. % from each other.

Preparation of the HSBC Composition: The components (a) and (b) of the HSBC composition can be prepared by anionic polymerization using techniques known in the art, forming a precursor block copolymer. The polymerization initiator is generally an organometallic compound, such as organolithium compounds, example, ethyl-, propyl-, isopropyl-, n-butyl-, sec-butyl-, tert-butyl-, phenyl-, hexylbiphenyl-, hexamethylenedi-, butadieneyl-, isopreneyl-, 1,1-diphenylhexyllithium, or polystyryllithium. The amount of initiator needed is calculated based on the molecular weight to be achieved, generally from 0.002 to 5 mol percent, based on the amount of monomer to be polymerized. Suitable solvents for the polymerization include aliphatic, cycloaliphatic or aromatic hydrocarbons having from 4 to 12 carbon atoms, such as pentane, hexane, heptane, cyclopentane, cyclohexane, methylcyclohexane, decalin, isooctane, benzene, alkylbenzenes, such as toluene, xylene or ethylbenzene, or suitable mixtures.

Polymer chain termination is carried out using a carbanion quenching agent, e.g., an organic alcohol coupling agent, such as bi- or polyfunctional compounds, e.g., divinylbenzene, halides of aliphatic or araliphatic hydrocarbons, such as 1,2-dibromoethane, bis(chloromethyl)benzene, or silicon tetrachloride, dialkyl- or diarylsilicon dichloride, alkyl- or arylsilicon trichloride, tin tetrachloride, alkylsilicon methoxides, alkyl silicon ethoxides, polyfunctional aldehydes, such as terephthalic dialdehyde, ketones, esters, anhydrides or epoxides. In embodiments with coupling, the coupling agent is selected from the group consisting of methyltrimethoxysilane (MTMS), tetramethoxysilane (TMOS), divinylbenzene (DVB), and dimethyladipate (DMA).

If desired, a Lewis base additive, which affects polymerization parameters can be employed. Examples of Lewis bases include dimethyl ether, diethyl ether, ethylene glycol dimethyl ether, 1,2-diethoxypropane, diethylene glycol dimethyl ether, tetrahydrofuran, tetrahydrofurfuryl ethers, such as tetrahydrofurfuryl methyl ether, and tertiary amines.

Hydrogenation of the polymer precursor provides the HSBCs under conditions to achieve the appropriate levels of hydrogenation in the polymer blocks A-D. A suitable catalyst based on nickel, cobalt or titanium can be used in the hydrogenation step.

The components (a) and (b) can be mixed in solvent or in molten state to form the HSBC composition. The components (b) is preferable mixed into a component (a) in solvent.

Properties of the HSBC Composition: The HSBC compositions exhibit elastomeric performance and good mechanical performance. They also have excellent resistance to leaching. They also show good elasticity, e.g., a low compression set. In embodiments, the block copolymer compositions have a compressions set of <50%, or <40%, or <35% measured after 24 hours of compression at 70° C. according to ASTM D395.

In embodiments, the HSBC composition has good processability as measured by apparent viscosity with Capillary Rheometry at 230° C. of <70 Pa·s, or <50 Pa·s. or 5-45 Pa·s.

In embodiments, the HSBC composition shows a low level of extractables of <0.1%, or <0.05%, or <0.005%, measured by degree of absorbance of light at wavelengths of 220 nm-360 nm, after treatment according to standard YBB00042005.

Blends Based on the HSBC Compositions: The HSBC compositions can be used for preparing blends for various end-use applications, e.g., blended with polymers that are not extractable by hydrocarbon based or water-based solvents.

In embodiments, the polymer for the blends is selected from the group of polystyrene, a polyolefin, such as polypropylene, polyethylene and blends thereof, a thermoplastic elastomer, such as a thermoplastic polyurethane or thermoplastic copolyester; an aromatic polyether resin, or combinations thereof. Suitable polyolefins include a crystalline thermoplastic polymer containing >50 wt. % of the total weight of the polymer, of polymerized ethylene units. Other suitable plastics include polyamides, copolymers of styrene with comonomers such as acrylonitrile and methacrylates, or mixtures.

In embodiments, the blend comprises 100 parts by weight of the HSBC composition and 1 to 95 parts, or 1-20 parts, or 5-50 parts, or 25-60 parts, or 30-75 parts, or 70-90 parts by weight of a semi-crystalline polyolefin; wherein the semicrystalline polyolefin is selected from the group of a homopolypropylene, a propylene copolymer, and combinations thereof, with the semi-crystalline polyolefin having a melting point of >125° C.

The semi-crystalline propylene copolymer can have repeat units derived from at least one comonomer selected from the group consisting of ethylene and at least one C4 to C20 α-olefin, preferably having an average propylene content of >65 mol %, or >73 mol %, or >85 mol %. The polypropylene homopolymers preferably have >95%, or >97% or more heptane insolubles. The insoluble content can be measured, e.g., by drying a bulk sample at 100° C. in a vacuum oven and then boiling in n-heptane for 1.5 hours. Thereafter samples are vacuum dried, rinsed with acetone and dried in a vacuum oven at 100° C. The heptane insoluble content in % is given by: 100×(weight of sample after boiling and drying in vacuum) divided by weight of the sample prior to combining with n-heptane.

The polypropylene copolymer can have a melt flow rate (MFR) as measured according to ASTM D 1238(B) with 230° C. and 2.16 kg of 1-3000 dg/min, or 3-200 dg/min, or 5-100 dg/min, or 10-50 dg/min. The crystallinity in the propylene copolymer can be derived from the domains having either the isotactic sequences, or the syndiotactic sequences. Examples of the semi-crystalline polypropylene include a random copolymer of ethylene and propylene, having a melting point by Differential Scanning Calorimetry (DSC) analysis (ASTM E-794-95) in a range of 100-170° C., or 120-150° C., or 140-150° C.

In embodiments, the blend further comprises up to 100 parts by weight, per 100 parts of the blend, of one or more additives, e.g., a polyphenylene ether, an inorganic or organic filler, carbon black, flame retardants, antioxidants, UV stabilizers, dyes, and surface agents.

Preparation of TPE Blend Based on HSBC Compositions: The HSBC compositions can be blended with other components using a suitable device such as a Henschel mixer, a V blender, a ribbon blender, etc. The final blend can be obtained by mixing the ingredients or pre-blended ingredients in a single screw or twin screw extruder, a kneader, or the like. The resultant mixed and molten blend can also be pelletized.

Properties of the TPE Blend: In embodiments, the TPE blends are characterized as being oil free and phthalate free with the HSBC composition having a short diblock, obviating the need for additives such as paraffinic oil and/or phthalate. The TPE blends are characterized as having good elastomeric and flow properties. They also have excellent resistance to leaching, and show good mechanical performance in term of strength, and elasticity, e.g., a low compression set. In embodiments, the TPE blend has a compressions set of <40% or <50%, or <40%, or 0-30%, or 10-40%, or 20-30%, measured after 24 hours of compression at 70° C. according to ASTM D395.

In embodiments, the TPE blend has a low level of extractables of <0.1%, or <0.05%, or <0.005%, measured by the degree of absorbance of light between the wavelengths of 220 nm and 360 nm, after treatment according to YBB00042005.

To enable melt-processing the apparent viscosity of the TPE blends is <70 Pa·s, or <50 Pa·s. or preferably between 5 Pa·s and 45 Pa·s. measured via capillary rheometry at a shear rate of 5000/s at 200° C.

Uses of the blends: The TPE blends/compounds can be processed into sheets, molded articles, profile extrusions, and films, into articles using known techniques, e.g., foaming (for foamed articles), coating, injection molding, extrusion, co-extrusion, blow molding, hot melt spraying, laminating with other materials, compression molding, and solution spraying to provide articles.

The compositions can be used for making a variety of articles, particularly those used in the medical field such as medical bags, medical tubes, or medicine bottle stoppers, medical containers and caps, multi-lumen tubes, multi-layer tubes, and sterilizable articles, IV bags, catheters and catheters such as those used for infusion, blood transfusion, peritoneal dialysis, and catheter intervention, such as intravascular catheters and balloon catheters, blood bags, synthetic vascular prostheses, vascular circuits, syringes, hemodialyzers, blood cell separators, extracorporeal membrane oxygenation, dressing materials, and medical devices that are brought into contact with body fluids, etc. Tubes can be made with no particular limitation on the size, shape or cross-section size, using an extruder and forcing melted blend through a die to form a tube, and cooling with water/air.

The compositions can also be used for making articles having applications in automotive or transportation, tires, sealants, adhesives, damping layers in films, buildings, construction, shoes, industrial equipment, healthcare, medical devices, sport equipment, grips, prosthetic components, and bullet-proof equipment.

Examples. The following test methods are used:

Hardness shore A with 10 second dwell time is measured on a 6 mm thick mm plate according to ASTM D2240.

Melt flow rates (MFR) are measured according to ASTM D1238 under 2.16 kg load and at 230° C.

Compression set is measured by ASTM D395 Method B. The sample is compressed 25%, otherwise specified for a specified time at a specified temperature as given in the table-2. Compression set is taken as the percentage of the non-recovered deflection after the material is allowed to recover at standard conditions for 30 minutes. Test pieces: diameter 13 mm, thickness 6 mm for compression molded samples and 6.3 mm for injection molded samples.

Sterilization is carried out at 121° C. for 30 minutes in an autoclave.

Bleed out during compression set measurement is carried out by placing a piece of absorption paper under the test pieces during the compression tests. Visual inspection after the tests will show bleeding (seen from discoloring of the paper) or no bleeding of the polymer compounds or neat polymers.

Tensile strength, modulus at 300% elongation, and elongation at break are measured according to ISO-37, with distance between clamps: 35 mm; distance between extensiometers: 20 mm; pre-load before testing 0.5N, speed up to pre-load 50 mm/min, test speed 500 mm/min. Testing is carried out in a conditioned room at 23° C. and a relative humidity of 50%.

Extractables are determined according to standard YBB00042005.

Capillary Rheometry viscosity is measured at 230° C. for HSBC composition and at 200° C. for TPE blends, at applied shear rate of 5000/s, a die diameter of 1 mm and die length of 20 mm, as apparent viscosity in Pa·s.

UV absorbance measurement against TPE blends is carried out by filtering the test solution with a 0.45 μm filter membrane, conduct the test according to spectrophotometry (Pharmacopoeia of People's Republic of China (2000), Column 2, Appendix IV A). The maximum absorbance between 220 nm and 360 nm is not more than 0.10%. TPE blends are injection molded into sheet samples. Test solution is prepared by collecting samples with a total surface area of 200 cm2, soak in 400 ml water in a flask and boil 5 min. After cooling down, rinse 5 times with 400 ml water each time. Transfer the samples into a conical flask, add 400 ml water, place the flask into an autoclave, heat to 121±2° C. within 30 min. Keep for 30 min at this temperature, cool down to room temperature within 20-30 min and take out the solution.

The components used in the examples include:

(a1) is an example of component (a) block copolymer, which is a selectively hydrogenated styrene-butadiene-styrene block copolymer having 30 wt. % Corrected 1,4 diene unit content in the polybutadiene units before hydrogenation, and Mp of 235 kg/mol and a total styrene content of 33 wt. %.

(a2) is an example of component (a) block copolymer, which is a selectively hydrogenated styrene-butadiene-styrene block copolymer having 30 wt. % Corrected 1,4 unit content in the polybutadiene units before hydrogenation, and Mp of 382 kg/mol and a total styrene content of 34 wt. %.

(b1-b8) in Table 1 are examples of component (b) copolymers, selectively hydrogenated styrene-butadiene diblock copolymers having different molecular weight (Mp's) polystyrene (PS) block, hydrogenated di-block (HSBC), styrene content, and corrected 1,4 unit content in the polybutadiene units before hydrogenation.

TABLE 1

| Experiment | PS block Mp Kg/mol | HSBC di-block Mp Kg/mol | PS content weight % | C14DUC weight % |
|---|---|---|---|---|
| b1 | 4.4 | 37.5 | 16 | 32 |
| b2 | 4.5 | 38.1 | 17 | 30 |
| b3 | 2.5 | 18.2 | 18 | 26 |
| b4 | 4.1 | 26.8 | 22 | 31 |
| b5 | 5.6 | 34.5 | 25 | 34 |
| b6 | 6.4 | 31.1 | 30 | 34 |
| b7 | 7 | 49.7 | 19 | 34 |
| b8 | 4 | 39 | 15 | 40 |

(p1) is a semi-crystalline polypropylene (PP) copolymer having a MFR (230° C. and 2.16 kg) of 11 dg/min, and a Vicat softening temperature (A50 test method) of 130° C.

(a3) is a hydrogenated S-B-S with 33 wt. % polystyrene content, and 61 wt. % of corrected 1,4-butadiene unit content in the polymerized conjugated diene units before hydrogenation, having Mp=280 kg/mol (y1) is a hydrogenated polybutadiene with Mp 5.3 kg/mol, 62 wt. % Corrected 1,4-butadiene unit content in the polymerized conjugated diene before hydrogenation.

(p2) is a polypropylene homopolymer with MFR 5 dg/min and melting point of 162° C.

(p3) is a polypropylene random-heterophasic copolymer with MFR 4 dg/min and melting temperature of 141° C. (ISO3146) and Vicat A50 of 120° C. (ISO306).

(p4) is a polyolefin elastomer crystalline ethylene-butylene copolymer with MFR (190° C.; 2.16 kg) of 5 dg/min and melting point of 35° C.

(i1) is, a primary phenolic antioxidant with resistance to extraction; and (i2) is, a secondary hydrolytically stable phosphite antioxidant.

The compositions and blends were combined in a mixing Brabender at 230° C. for 5 mins at 50 rpm. The resulting compositions and blends pressed for 10 minutes at 230° C. to form plates, followed by cooling down under pressure. Table 2 shows the HSBC compositions and the blends prepared. Table 3 lists the test results for the HSBC compositions and blends.

TABLE 2

(Examples 1-4). Blends and HSBC composition prepared.

| | | TPE blends | | HSBC compositions | |
|---|---|---|---|---|---|
| Ingredients | | Example 1 | Example 2 | Example 3 | Example 4 |
| a1 | parts | 100 | — | 100 | — |
| a2 | parts | — | 100 | — | 100 |
| b1 | parts | 50 | 50 | 50 | 50 |
| p1 | parts | 12.16 | 12.16 | — | — |

TABLE 3

Properties of HSBC composition and TPE blend compounds.

| Properties | | Example 1 | Example 2 | Example 3 | Example 4 |
|---|---|---|---|---|---|
| MFR(230 C., 5 kg) | g/d min | <1 | <1 | — | — |
| CS(24 h@30° C.) | % | 19 | 16 | 11 | 15 |
| CS(24 h@50° C.) | % | 21 | 31 | 21 | 28 |
| CS(24 h@70° C.) | % | 23 | 30 | 24 | 23 |
| CS (24 h@100° C.) | % | 48 | 44 | 52 | 46 |
| CS (24 h@120° C.) | % | 59 | 47 | 70 | 71 |
| Bleed out during CS tests | Yes—Y No—N | Y | N | N | N |
| Hardness | ShoreA | 46 | 46 | 33 | 29 |
| Tensile Strength | MPa | 8.7 | 6.2 | 6.4 | 5.8 |
| Elong. at break | % | 670 | 580 | 690 | 760 |
| Extractable UV absorbance YBB00042005 | % Abs | 0.002 | 0.001 | 0.001 | <0.001 |

Examples 1-4 show thermoplastic processability, surprisingly low compression set at 70° C., very low extractables and no bleed out during the compression set tests in addition to good mechanical properties and medium hardness suitable for various applications. Examples 1 and 2 with a low content of polypropylene random copolymer, demonstrate superior processing and improved elasticity at >70° C. and higher hardness.

Blends were also made to compare their performance with those of the blends shown in Table 2. The results are shown in Table 4.

TABLE 4

| Components | | Example 5 | Example 6 |
|---|---|---|---|
| a1 | parts | 100.0 | — |
| a3 | parts | — | 100 |
| y1 | parts | — | 100 |
| p2 | parts | — | 34 |
| p3 | parts | 20 | — |
| p4 | parts | 160 | — |
| i1 | parts | 0.2 | 0.2 |
| i2 | parts | 0.2 | 0.2 |
| Blend Properties | | | |
| MFR | dg/min | 6 | <1 |
| Hardness | Shore A | 60 | 63 |
| CS(70° C.; 24 h) | % | 53 | 30 |
| Bleed out during CS tests | Yes/None | None | YES |

Table 4 shows that Example 5 exhibits a compression set at 70° C. of >40%, despite the use of the (a1) block copolymer. Example 6 results in a low compression set value at 70° C. of 30%, but exhibits undesired bleed out during the compression set test.

Table 5 shows the effect of PP-content on compound (a1)+(b1)+PP. The ratio (a1):(b1) was 2:1. Blend with 30% (p1) has high hardness and CS70 >40%.

TABLE 5

| | | TPE blends | | | |
|---|---|---|---|---|---|
| Ingredients | | Example 8 | Example 10 | Example 7 | Example 9 |
| a1/b1 (2:1) | % | 100 | 92.5 | 85 | 70 |
| p1 | % | 0 | 7.5 | 15 | 30 |

TABLE 5-continued

| | | TPE blends | | | |
|---|---|---|---|---|---|
| Ingredients | | Example 8 | Example 10 | Example 7 | Example 9 |
| Hardness | ShA | 33 | 46 | 59 | 80 |
| CS 70 | % | 24 | 23 | 38 | 44 |
| UV absorption | % | nm | nm | 0.006 | 0.006 |
| Effect of PP content | | — | — | — | — |

Table 6 are TPE blends (Examples 11-14). Blends with 100 parts (a1):(b2) varying from 1:2 to 4:1 with (p1) polypropylene show excellent combination of CS70 and hardness. All blends show desirable CS70, hardness, and low UV absorbance.

TABLE 6

| Ingredients | | Example 11 | Example 12 | Example 13 | Example 14 |
|---|---|---|---|---|---|
| a1/b2 (1:2) | % | 92.5 | 0 | 0 | 0 |
| a1/b2 (1:1) | | 0 | 92.5 | 0 | 0 |
| a1/b2 (2:1) | | 0 | 0 | 92.5 | 0 |
| a1/b2 (4:1) | | 0 | 0 | 0 | 92.5 |
| p1 | % | 7.5 | 7.5 | 7.5 | 7.5 |
| Hardness | ShA | 25 | 33 | 45 | 57 |
| CS 70 | % | 30 | 27 | 36 | 38 |
| UV absorption | % | 0.018 | 0.02 | 0.011 | 0.007 |
| Effect of a/b ratio | | — | — | — | — |

Table 7 are more TPE blends (Examples 19-24), with ratio (a1):(b2) varying from 1:2 to 2:1, combined with varying PP types and amounts. All compositions show very low UV absorbance.

TABLE 7

| Ingredients | | Ex. 19 | Ex. 20 | Ex. 21 | Ex. 22 | Ex. 23 | Ex. 24 |
|---|---|---|---|---|---|---|---|
| a1/b2 (1:2) | % | 70 | 0 | 0 | 70 | 0 | 0 |
| a1/b2 (1:1) | | 0 | 75 | 0 | 0 | 75 | 0 |
| a1/b2 (2:1) | | 0 | 0 | 85 | 0 | 0 | 85 |
| p2 | | 0 | — | — | 30 | 25 | 15 |
| p1 | % | 30 | 25 | 15 | 0 | 0 | 0 |
| Hardness | ShA | 73 | 68 | 56 | 76 | 71 | 60 |
| CS 70 | % | 57 | 50 | 39 | 62 | 52 | 47 |
| UV absorption | % | 0.028 | 0.023 | 0.015 | 0.021 | 0.015 | 0.016 |
| Effect of a/b ratio and PP | | | | | | | |

Table 8 show more TPE blends, with viscosity of blend 32 (24.3 Pa·s) with 7.5% (p1) being almost the same as a1/b6 viscosity. To enable melt processing for some applications, apparent viscosity measured at 230° C. and shear rate of 5000/s should be <70 Pa·s, preferably <50 Pa·s.

TABLE 8

| Ingredients | | Ex. 12 | Ex. 27 | Ex. 29 | Ex. 31 | Ex. 32 | Ex. 33 |
|---|---|---|---|---|---|---|---|
| a1/b2 (1:1) | % | 92.5 | — | — | — | — | — |
| a1/b3 (1:1) | % | — | 92.5 | — | — | — | — |
| a1/b4 (1:1) | % | — | — | 92.5 | — | — | — |
| a1/b5 (1:1) | % | — | — | — | 92.5 | — | — |

TABLE 8-continued

| Ingredients | | Ex. 12 | Ex. 27 | Ex. 29 | Ex. 31 | Ex. 32 | Ex. 33 |
|---|---|---|---|---|---|---|---|
| a1/b6 (1:1) | % | — | — | — | — | 92.5 | — |
| a1/b7 (1:1) | % | — | — | — | — | — | 92.5 |
| p1 | % | 7.5 | 7.5 | 7.5 | 7.5 | 7.5 | 7.5 |
| Hardness | ShA | 33 | 25 | 33 | 45 | 57 | 41 |
| CS 70 | % | 27 | 30 | 27 | 36 | 38 | 45 |
| UV absorption | % | 0.02 | 0.018 | 0.02 | 0.011 | 0.007 | nm |
| Viscosity of a/b | Pa·s | 24.7 | 16.7 | 27.3 | 20.9 | 23.5 | 43.5 |
| Viscosity of a/b/p1 | | — | — | — | — | 24.3 | — |
| Effect b block sizes | | — | — | — | — | — | — |
| Viscosity at 230° C. and shear rate 5000/s in Pa·s | | — | — | — | — | — | — |

Examples 34-44: A design of experiments was set up to further investigate achievable properties, with formulations based on 100 phr base polymer (a1), varying contents of (b8) and (p1), and 0.02 wt. (i1) and 0.02 wt. % (i2). Compounds were produced on a co-rotating twin screw extruder at 200° C., followed by injection molding at 200° C. into test plates of 6.3 mm to measure hardness, compression set before and after sterilization and apparent viscosity at 200° C. measured at a shear rate of 5000/s.

TABLE 9

Blend formulations and properties.

| Example | a1 phr | b8 phr | p1 phr | Hardness Shore A | CS 70 % (*) | CS 70 % (**) | CS 120 % | Viscosity 200° C. Pa·s |
|---|---|---|---|---|---|---|---|---|
| 34 | 100 | 50 | 30 | 67.8 | 36.3 | nm | 56.1 | nm |
| 35 | 100 | 50 | 10 | 50.0 | 37.7 | nm | 57.7 | nm |
| 36 | 100 | 25 | 20 | 71.8 | 38.3 | nm | 51.5 | nm |
| 37 | 100 | 75 | 20 | 50.4 | 34.4 | 31.8 | 56.4 | 40.5 |
| 38 | 100 | 25 | 40 | 82.8 | 43.7 | nm | 60.0 | nm |
| 39 | 100 | 75 | 40 | 64.4 | 37.5 | 33.5 | 58.6 | 39.6 |
| 40 | 100 | 50 | 50 | 79.7 | 41.4 | nm | 60.5 | nm |
| 41 | 100 | 100 | 30 | 49.8 | 35.5 | 32.0 | 58.2 | 31.7 |
| 42 | 100 | 20 | 30 | 81.4 | 42.5 | nm | 54.3 | nm |
| 43 | 100 | 100 | 16.2 | 37.3 | 37.2 | 30.7 | 62.5 | 32.7 |
| 44 | 100 | 0 | 30 | Impossible to melt-process | | | | |

(*) Before sterilization
(**) After sterilization

Most examples except the blends with hardness close to 80 Shore A, show an attractive balance of hardness and compression set values at 70° C. of less than 40%. From this data set, formulation numbers 37, 39, 41 and 43 were selected for further testing, based on CS70 and hardness, according to specific test methods required for different applications and depending on the end-use region. Example 43 shows the best combination of properties with UV absorbance <0.1%, low penetration force, low compression set at 70° C. (after sterilization), low hardness and excellent processing (viscosity at 200° C. and shear rate 5000/s of 32.7 Pa·s).

For IV stopper tests via any of test methods YBB-00042005/YBB-00332004, CP TPE method 2021, and USP381, the blends showed extractable amounts of <0.1% UV absorption (absorbance 220-360 nm), and passed static spike retention capacity (0.5 kg & 4 hrs.) before and after sterilization with no leakage, fall-out, liquid outflow after needle pull out. The compression set value at 70° C. and 24 hrs. was within the expected range of 30-35% (DIN ISO 815-1). Hardness Shore A property was also within the range of 30-60 for IV stopper (DIN ISO 7619-1). Penetration force was below the spec. value of 200N (ISO 15759), and even <100N for some examples, or below the spec. value of 80N with an average of 75N (YBB-00042005/YBB-00332004/ CP TPE method 2021) Retention force was above the spec. value of 15N via tests methods YBB-00042005, YBB-00332004, CP TPE method 2021 or ISO 15759. The blends also passed the flow property test with viscosity in the range of 5-100 Pa·s (injection molded samples with shear viscosity between 1000-10000 (1/s), 230° C.). With respect to fragmentation tests via ISO 15759/USP381 methods, the samples show <20 particles (>150 μm), or <10 particles (>50 μm), or <=7 particles (>=50 μm), or <=5 particles (>50 μm).

Similarly for vial stopper evaluations including tests against USP381/USP382 methods, the samples passed the extractable test with <=0.2%, penetration force below the spec. value of <10N, compression set value at 70° C. and 22 hrs. was 30-35%, and passing the flow property test with viscosity in the range of 5-100 Pa·s. Hardness Shore A property was also within the range of 30-40 for vial stopper (DIN ISO 7619-1). In fragmentation tests (USP381/USP382 methods), the samples show <5 particles (>50 μm), or <5 particles (>150 μm).

As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

The following are enumerated embodiments are provided as non-limiting examples.

A first embodiment which is a hydrogenated block copolymer comprising block copolymer components (a) and (b), wherein component (a) is a selectively hydrogenated block copolymer comprising one or more structures A-B-A, (A-B-A)nX, A-(B-A)n, and (A-B)nX. Component (b) is a selectively hydrogenated block copolymer comprising one or more structures C-D, D-C-D, and (D-C-)nX; In the formulas, "n" is 1-30, and "X" is a residue of a coupling agent. Before hydrogenation, A is a polymer block of a vinyl aromatic monomer, having a peak molecular weight (Mp) of 14-60 kg/mol, B is a polymer block comprising 60-100 mol % of one or more conjugated dienes, and 0-40 mol % of a vinyl aromatic monomer; C is a polymer block of a vinyl aromatic monomer, having a peak molecular weight of 1-8 kg/mol; D is a polymer block comprising 60-100 mol % of one or more conjugated dienes, and 0-40 mol % of a vinyl aromatic monomer; After hydrogenation, from more than 80 to 100 mol % of the polymerized diene units, and from 0-20 mol % of the polymerized vinyl aromatic monomer units in the polymer blocks A, B, C and D are reduced. The vinyl aromatic monomers of the polymer blocks A, B, C and D are independently same or different; and the conjugated diene monomers for the polymer blocks B and D are independently same or different. The block copolymer (a) has a peak molecular weight of from 100-1,000 kg/mol and the block copolymer (b) has a peak molecular weight of from 6-60 kg/mol, The overall block copolymer composition has a compression set, after 24 h at 70° C. of less than 50 percent, measured according to ASTM D395, an apparent viscosity measured at 2300 C, and a shear rate of 5000/s of <70 Pa·s. A first embodiment which is a thermoplastic elastomer blend comprising 100 parts by weight of the hydrogenated block copolymer of Claim 1, and 95 to 1 parts by weight of a semi-crystalline polyolefin.

A second embodiment which is a thermoplastic elastomer blend of the first embodiment, further comprising up to 100 parts, per 100 parts of the blend, at least an additive selected from, a polyphenylene ether, an organic filler, an inorganic filler, carbon black, a flame retardant, an antioxidant, a UV stabilizer, a dye, and a surface agent.

A third embodiment which is a thermoplastic elastomer blend of the first embodiment, wherein the thermoplastic elastomer blend has a compression set, measured after 24 hours at 70° C. according to ASTM D395, of less than 45%.

A fourth embodiment which is a thermoplastic elastomer blend of the first embodiment, wherein the thermoplastic elastomer blend has a level of extractables measured by UV on a pre-treated sample, according to YBB00042005, of <0.1% absorbance.

A fifth embodiment which is a thermoplastic elastomer blend of the first embodiment, wherein the thermoplastic elastomer blend has an apparent viscosity of <70 Pa·s., measured via capillary rheometry at a shear rate of 5000/s at 200° C.

A sixth embodiment which is a thermoplastic elastomer blend of the first embodiment, wherein the thermoplastic elastomer blend is oil free.

A seventh embodiment which is a thermoplastic elastomer blend of the first embodiment, wherein the thermoplastic elastomer blend is phthalate free.

A eighth embodiment which is a thermoplastic elastomer blend of the first embodiment, wherein the hydrogenated block copolymer is present in an amount of 60-95 parts by weight based on the total amount of the blend.

A ninth embodiment which is a thermoplastic elastomer blend of the first embodiment, wherein the semi-crystalline polyolefin is present in an amount of 5-40 parts by weight based on the total amount of the blend, wherein the semicrystalline polyolefin is selected from the group consisting of a homopolypropylene, a propylene copolymer, and combinations thereof.

A tenth embodiment which is a thermoplastic elastomer blend of the ninth embodiment, wherein the propylene copolymer has a melting point of above 125° C.

A eleventh embodiment which is an article comprising the thermoplastic elastomer blend of the second embodiment.

A twelfth embodiment which is the article of eleventh embodiment, selected from a sheet, a molded article, a profile extrusion, and a film.

A thirteenth embodiment which is the article of eleventh embodiment, selected from a medical bag, a medical tube, a vial stopper, an IV stopper.

A fourteenth embodiment which is the article of thirteenth embodiment, wherein the article is a vial stopper or an IV stopper, and whether the article has <20 particles of >150 μm in size when tested under USP381 fragmentation test method, and hardness Shore A within a range of 30-60 when tested according to ISO 7619-1.

The invention claimed is:

1. A hydrogenated block copolymer comprising block copolymer components (a) and (b), wherein
block copolymer component (a) is a selectively hydrogenated block copolymer comprising one or more structures A-B-A, (A-B-A)nX, A-(B-A)n, and (A-B)nX;
block copolymer component (b) is a selectively hydrogenated block copolymer comprising one or more structures C-D, D-C-D, and (D-C-)nX; and wherein "n" is 1-30, and "X" is a residue of a coupling agent;
wherein before hydrogenation,
A is a polymer block of a vinyl aromatic monomer, having a peak molecular weight (Mp) of 14-60 kg/mol,
B is a polymer block comprising 60-100 mol % of one or more conjugated dienes, and 0-40 mol % of a vinyl aromatic monomer;
C is a polymer block of a vinyl aromatic monomer, having a peak molecular weight of 1-8 kg/mol; and
D is a polymer block comprising 60-100 mol % of one or more conjugated dienes, and 0-40 mol % of a vinyl aromatic monomer;
wherein after hydrogenation,
80 to 100 mol % of the polymerized diene units in the polymer blocks B and D are reduced; and
0-20 mol % of the polymerized vinyl aromatic monomer units in the polymer blocks A, B, C and D are reduced;
wherein the vinyl aromatic monomers of the polymer blocks A, B, C and D are independently same or different and the conjugated diene monomers for the polymer blocks B and D are independently same or different;
wherein the block copolymer component (a) has a peak molecular weight of 100-1,000 kg/mol and the block copolymer component (b) has a peak molecular weight of 6-60 kg/mol; and
wherein the hydrogenated block copolymer has a compression set after 24 hrs. at 70° C. of less than 50%, measured according to ASTM D395, an apparent viscosity measured at 230° C., and a shear rate of 5000/s of <70 Pa·s.

2. The hydrogenated block copolymer of claim 1, wherein the components (a) and (b) are in a weight ratio ranging from 1:0.1 to 1:5, respectively.

3. The hydrogenated block copolymer of claim 1, wherein the block copolymer component (a) has a peak molecular weight of 150-800 kg/mol.

4. The hydrogenated block copolymer of claim 1, wherein the block copolymer component (b) has a peak molecular weight of 10-50 kg/mol.

5. The hydrogenated block copolymer of claim 1, wherein the polymer block A forms 18-40 wt. % of the overall weight of component (a).

6. The hydrogenated block copolymer of claim 1, wherein before hydrogenation,
A is a polymer block of a vinyl aromatic monomer, having a peak molecular weight (Mp) of 20-50 kg/mol,
B is a polymer block comprising 70-90 mol % of one or more conjugated dienes, and 10-30 mol % of a vinyl aromatic monomer;
C is a polymer block of a vinyl aromatic monomer, having a peak molecular weight of 2-6 kg/mol; and
D is a polymer block comprising 70-90 mol % of one or more conjugated dienes, and 10-30 mol % of a vinyl aromatic monomer.

7. The hydrogenated block copolymer of claim 1, wherein after hydrogenation,
85 to 98 mol % of the polymerized diene units in the polymer blocks B and D are reduced; and
2-15 mol % of the polymerized vinyl aromatic monomer units in the polymer blocks A, B, C and D are reduced.

8. The hydrogenated block copolymer of claim 1, wherein the polymer blocks B and D comprise polymerized diene units derived from the same conjugated diene, and wherein the conjugated diene is selected from the group consisting of 1,3-butadiene, isoprene, myrcene, farnesene, 2,3-dimethyl-1,3-butadiene, 1,3-pentadiene, 1,3-hexadiene, and combinations thereof.

9. The hydrogenated block copolymer of claim 1, wherein the polymer blocks A, B, C, and D independently comprise polymerized vinyl aromatic monomer units derived from the same vinyl aromatic monomer, wherein the vinyl aromatic monomer units is selected from the group consisting of styrene, o-methylstyrene, p-methylstyrene, p-tert-butylstyrene, 2,4-dimethylstyrene, alpha-methylstyrene, vinylnaphthalene, vinyltoluene, vinylxylene, and combinations thereof.

10. The hydrogenated block copolymer of claim 1, wherein the hydrogenated block copolymer has a compression set after 24 hrs. at 70° C. of less than 40%, measured according to ASTM D395.

11. The hydrogenated block copolymer of claim 1, wherein the hydrogenated block copolymer has an apparent viscosity measured at 230° C. and a shear rate of 5000/s of <50 Pa·s.

12. A thermoplastic elastomer blend comprising 100 parts by weight of the hydrogenated block copolymer of claim 1, and 95 to 1 parts by weight of a semi-crystalline polyolefin.

13. The thermoplastic elastomer blend of claim 12, further comprising up to 100 parts, per 100 parts of the blend, at least an additive selected from, a polyphenylene ether, an organic filler, an inorganic filler, carbon black, a flame retardant, an antioxidant, a UV stabilizer, a dye, and a surface agent.

14. The thermoplastic elastomer blend of claim 12, wherein the thermoplastic elastomer blend has a compression set, measured after 24 hours at 70° C. according to ASTM D395, of less than 45%.

15. The thermoplastic elastomer blend of claim 12, wherein the thermoplastic elastomer blend has a level of extractables measured by UV on a pre-treated sample, according to YBB00042005, of <0.1% absorbance.

16. The thermoplastic elastomer blend of claim 12, wherein the thermoplastic elastomer blend has an apparent viscosity of <70 Pa·s, measured via capillary rheometry at a shear rate of 5000/s at 200° C.

17. The thermoplastic elastomer blend of claim 12, wherein the thermoplastic elastomer blend is oil free and phthalate free.

18. An article comprising the thermoplastic elastomer blend of claim 12.

19. The article of claim 18, selected from a sheet, a molded article, a profile extrusion, a film, a medical bag, a medical tube, a vial stopper, and an IV stopper.

* * * * *